US011416819B2

(12) United States Patent
George et al.

(10) Patent No.: US 11,416,819 B2
(45) Date of Patent: Aug. 16, 2022

(54) CONNECTING CONTACT CENTER RESOURCES USING DLT FOR IOT SOLUTIONS

(71) Applicant: Avaya Management L.P., Santa Clara, CA (US)

(72) Inventors: Jibin George, Pune (IN); Salil Dhawan, Pune (IN); Sandeep Goynar, Pune (IN); Harsimran Jeet Singh, Pune (IN); John Young, Buntingford (GB)

(73) Assignee: Avaya Management L.P., Santa Clara, CA (US)

( * ) Notice: Subject to any disclaimer, the term of this patent is extended or adjusted under 35 U.S.C. 154(b) by 225 days.

(21) Appl. No.: 16/883,849

(22) Filed: May 26, 2020

(65) Prior Publication Data
US 2021/0374675 A1 Dec. 2, 2021

(51) Int. Cl.
| | |
|---|---|
| G06F 11/30 | (2006.01) |
| G06Q 10/10 | (2012.01) |
| G06Q 10/00 | (2012.01) |
| G06Q 10/06 | (2012.01) |
| G06F 21/62 | (2013.01) |
| G06F 16/27 | (2019.01) |
| G06F 11/07 | (2006.01) |
| G06Q 30/00 | (2012.01) |

(52) U.S. Cl.
CPC ....... *G06Q 10/103* (2013.01); *G06F 11/0775* (2013.01); *G06F 11/0793* (2013.01); *G06F 11/30* (2013.01); *G06F 16/27* (2019.01); *G06F 21/6218* (2013.01); *G06Q 10/06311* (2013.01); *G06Q 10/20* (2013.01); *G06Q 10/06315* (2013.01); *G06Q 30/016* (2013.01)

(58) Field of Classification Search
CPC ............. G06F 11/0775; G06F 11/0793; G06F 11/0784; G06F 11/0766; G06F 11/07; G06F 11/0706; G06F 11/0709; G06F 11/30; G06F 11/3003; G06F 11/3055; G06F 11/3058; G06F 11/3065; G06F 16/27; G06F 11/006
See application file for complete search history.

(56) References Cited

U.S. PATENT DOCUMENTS

| | | | |
|---|---|---|---|
| 2002/0116484 A1 | 8/2002 | Podracky | |
| 2018/0117446 A1 | 5/2018 | Tran et al. | |
| 2018/0315055 A1 | 11/2018 | Pickover et al. | |
| 2019/0207751 A1* | 7/2019 | Harvey | ................. H04L 9/0637 |
| 2020/0099698 A1* | 3/2020 | Kundu | ................ G06F 9/44505 |

(Continued)

FOREIGN PATENT DOCUMENTS

CN 108629718 10/2018

*Primary Examiner* — Yolanda L Wilson
(74) *Attorney, Agent, or Firm* — Sheridan Ross P.C.

(57) ABSTRACT

Multiple vendors often contribute a portion of their hardware and/or software to a customer to enable a particular feature. When issues occur, a contact center for more than one vendor may be required to perform an action in order to identify a resolution to the issue and apply the resolution. By coordinating multiple contact centers with smart contracts via a distributed leger, rules may be developed for the creation of blocks for notifications, escalations, tasks, and other actions or informational notifications to resolve the issue. Additionally, the blockchain may serve as a permanent record provide a history of actions taken, by whom, and when.

20 Claims, 6 Drawing Sheets

(56) References Cited

U.S. PATENT DOCUMENTS

| | | | |
|---|---|---|---|
| 2020/0105096 A1* | 4/2020 | Ovalle | G07F 17/3225 |
| 2020/0119905 A1* | 4/2020 | Revankar | G06Q 20/02 |
| 2020/0177373 A1* | 6/2020 | Komandur | H04L 9/3239 |
| 2021/0023490 A1* | 1/2021 | Kleemann | B22F 10/70 |
| 2022/0012367 A1* | 1/2022 | Ramanan | G06F 16/2379 |
| 2022/0044180 A1* | 2/2022 | Murao | G06Q 50/30 |
| 2022/0050449 A1* | 2/2022 | Brett | G05B 15/02 |

\* cited by examiner

CONNECTING CONTACT CENTER RESOURCES USING DLT FOR IOT SOLUTIONS

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for automated issue resolution and particularly to connecting multiple and distributed systems via an ad hoc communication channel.

BACKGROUND

As technology advances, so too does the complexity of technical issues. Technical support systems are often based on problem or issue reports, commonly referred to as "tickets." A user will create a ticket when something is not working (e.g., cannot log in) or a new service is needed (e.g., request permission to access a system or application). These tickets are then routed to the party who is most likely able to resolve the issue. For example, if network connectivity is an issue, then a ticket is created by a user and routed to a network administrator or dedicated technical support specialist. After the problem has been resolve the ticket is then closed. As systems grow more complex and integrated, one ticket may generate other tickets. For example, a network connectivity issue may be the result of component failure or misconfiguration or incompatibility with another component. Monitored components or systems may generate their own tickets or alarms when an operational parameter goes outside an expected value.

For larger products/solutions there can be various vendors involved in the solution. For example, a software as a service (SAS) provider may utilize a cloud provider for storage and data processing, communication network trunk providers, authorization services, customer installed hardware and software, and/or other vendors. When an alarm or ticket is received, human support teams comprised of representatives from the vendors are alerted and typically coordinate to find a root cause. Current systems often place products, or parts of the solution, in "silos" that restrict notifications to communication tools like Slack or email.

As more devices and systems become network connectable, known as the Internet of Things (IoT), such devices and systems play a major role in current and future solutions. For example, contact centers of each vendor may be able to receive data from various sensors attached to devices to provide data to a contact center. This allows the contact center to proactively look at alarms, however, human intervention teams are often not implemented to monitor alarms. Software and hardware systems may alarm to notify their respective contact centers within the IoT solution. Problems, and their required solutions, may span multiple vendors, each having their own knowledgebase of information and ability to implement a resolution, as applied and limited to their own products. Currently when humans are interacting with contact centers, the humans create multiple tickets with each individual contact center for each vendor who can, or may, need to implement a resolution.

SUMMARY

These and other needs are addressed by the various embodiments and configurations of the present invention. The present invention can provide a number of advantages depending on the particular configuration. These and other advantages will be apparent from the disclosure of the invention(s) contained herein.

When individual IoTs devices send data to a contact center for which they are programmed, there is a need for a trusted distributed system. The trusted distributed system can connect contact center agents/resources involved in resolving an issue when there are dependencies on multiple vendors/contact centers. Accordingly, IoT devices may connect with an ad-hoc network of the appropriate connect contact centers and/or contact center resources on a per-need basis. As one benefit, a faster the appropriate contact center resources are connected and made aware of the problem, the faster the resolutions.

As multiple vendors work a problem, each vendor may track their own progress without reporting to other vendors, further risking the introduction of additional errors and wasted resources as one vendor may assume another vendor has, or has not, taken a particular action and respond accordingly.

In one embodiment, and as a general overview, a distributed ledger where details of issues and/or resolutions spanning across multiple contact centers for IoT devices, can be placed and managed.

In one embodiment, the distributed ledger will be a blockchain with smart contracts. The smart contracts determine which conditions do or do not qualify for entry into the ledger. More specifically, each of the contact centers agree to the standards by which entries into the ledger will be judged. Any issue falling outside of the standards will be excluded from entry into the ledger and may be routed to a conventional resolution mechanism (e.g., single vendor, team of humans, etc.). As a result, the smart contracts are self-qualifying and do not require human input as to what does and does not qualify for entry into the ledger.

In another embodiment, resolution of an issue that has been entered into a ledger, may be first evaluated by one contact center. The evaluation may be entirely or partially automated. Should the evaluation reveal a dependency on another vendor's (or vendors') products, then a subsequent issue(s) will be generated and submitted to the distributed ledger, for qualification, such as for entry only upon determining the current issue is caused by or otherwise impacted by other parts (hardware and/or software) associated with other vendors and/or their contact centers.

In one embodiment, hardware communicates with its respective contact center via IoT sensors. Software may communicate via networking interfaces, such as WAN/LAN connectivity. The IoT devices both in the form of software and hardware are generally monitored through monitoring tools, such as Datadog™ and Loggly™. Monitoring tools will then send the data from the IoT sensors (e.g., log files, registry contents, memory stack, error code, or other raw and/or processed data) to the smart contracts residing on the ledger and, if qualified, the data and associated workflow will be added to the ledger. The ledger is preferably a distributed ledger, such as blockchain, wherein each peer is provided with a copy of the chain to promote immutability of the existing blocks, here, the smart contracts. A blockchain oracle service may be utilized as a source of external data and/or events accessible to each instance of a smart contract. The blockchain oracle server may be utilized so that each copy of the smart contract, as maintained by each copy of the ledger, may utilize data outside of the smart contract and still be evaluated to obtain the same result for each copy of the smart contract. If such a unanimous determination cannot be made, then the smart contract is not deterministic and should be rejected or otherwise considered errant or fraudulent.

In another embodiment, the types of data that will go into the blockchain can include data that is needed for record-keeping, such as for future tracking and speedier resolution of subsequent similar problems. For example, when one contact center is not able to meet their service level agreement (SLA) due to dependency on unresolved issues from other venders. Similarly, the other venders can do a lookup in the distributed ledger for that particular product, such as to identify related issues reported by other co-products in the solution. If a related issue is found, then information on this issue may be added as one or more inputs to the issue. Once a contact center is done with their evaluation the details can be placed in the ledger.

Data will originate from various devices and applications and be captured by the specific monitoring tools. The monitoring tools automatically search and/or categorize data and will have preconfigured triggers that, if present in the incoming data and/or if the categories are met, all or a portion of the data received will be sent to the smart contract. For example, data having an error category associated with a multi-vendor issue is received and the data sent to the smart contract. In another example, data in the form of event logs may be automatically searched for issues matching a particular pattern and, if found, sent to the smart contract. The smart contract residing on the specific ledger will evaluate the data submitted against the various patterns and, if found to be qualified, put into a transaction for entry to the ledger. For example, the patterns can be a specific entry in error data received from the monitoring tool. Searching may be across multiple sources of data. For example, one component having a particular latency may not be an issue for entry into the ledger, however, if the latency is observed by a number of components, entry into the leger may be approved. If compliant with the agreed criteria for entry into a smart contract, then the contract is entered into the ledger as agreed by each of the peers (e.g., participating contact centers).

Smart contracts may have code for component-specific pattern matching, such that if the data from one or more of the specific components has a specific format or common pattern matching if different components follow similar pattern for logging the data.

In another embodiment, the distributed ledger can make use of features like notifications mechanisms and consensus mechanisms for efficient handling of the issues. Notification mechanisms can be used for contact center A to get a notification when contact center B updates the ledger about the resolution. Similarly, contact center A may check product state or status by analyzing the current data stream coming from the sensors in the solution.

In another embodiment, the services workflow comprises steps, such as:
  a. Incident management
  b. Problem Management
  c. Change management
  d. Release management The embodiments disclosed herein enable the smart contracts to use the data for, at least, incident management. Generally, the incident management include:
  a. Detect and Record
  b. Classify and Prioritize
  c. Investigate and Diagnose
  d. Resolution and Restore
  e. Incident closure In another embodiment, the smart contract responsible for interacting with incident management automatically invokes an "off-chain" diagnostic that analyzes the logged device data. Additionally or alternatively, evaluation of diagnostics may be invoked periodically as part of an on-going maintenance health check for that device or invoked only when a problem has been reported as may be configured based on the nature and criticality of the service. If the diagnostic analysis requires additional data from the customer's solution (e.g., involving other IoT devices), then additional data from other relevant blockchain data is retrieved.

In another embodiment, depending upon whether a customer or consumer of the service initially reported the problem, or whether the diagnostic happened to reveal a problem with the device, the smart contract then automatically invokes the contact center's "off-chain" ticketing system in order to create a trouble-ticket. A smart contract can use the data in the blockchain and classify and prioritize the ticket. For example, after an incident, additional components may start reporting issues and a prioritization component of a smart contract, such as one associated with the initial incident, monitors the data from these additional components and executes a response. The response may be to adjust the priority of the original ticket during the diagnosis and/or notify the off-chain resources of the occurrence of the additional reports to provide additional into the diagnosis, urgency, and/or impact of the issue. The smart contract may pass the trouble-ticket identifier and/or content to other systems in order to support the overall workflow.

In another embodiment, the smart contract periodically retrieves status updates from the ticketing system and log updates to the blockchain. Resolution and/or restoration notes may be added into the blockchain along with the ticket status. Other vendors' contact centers' (and potentially the customer) could then access this blockchain data in order to share/retrieve trouble-shooting updates.

In another embodiment, the smart contracts check the blockchain data, such as within a previously determined response time from the initial incident, and close or reopen the ticket.

In other embodiments, the smart contracts may perform one or more of:
  1. Fallback decisions: For components will fallback systems, the smart contract may determine a fallback decision. For example, if there is a service outage with one product in the solution and the consensus data in the ledger is pointing to an expected outage time more than the threshold duration, the initiation/transfer of the service to the designated fallback component is executed.
  2. Run time error relevant message creation: Utilizing the ledger data, the smart contract may execute a reporting process so that interested parties may receive notification of relevant messages. For example, a consumers of a specific service may request or otherwise be authorized to receive relevant error messages.

In one embodiment, a system for managing multi-owner issue resolution is disclosed, comprising: a network interface to a network; a server, comprising a microprocessor accessing machine-readable instructions from a non-transitory memory and executing the machine-readable instructions to cause the processor to: receive a data structure from a monitoring component via the network interface; access a smart contract from a distributed ledger comprising evaluation code; evaluate the data structure with the evaluation code to produce a local qualification decision approving or denying entry to the distributed ledger; receive, from the network, a number of peer qualification decisions from a number of peer systems; upon obtaining a majority of decisions, comprising the local qualification decision and the number of peer qualification decisions, to approve, create a plurality of workflow block comprising at least a portion of the data structure and appending the plurality of workflow blocks to the distributed ledger, wherein at least one of the plurality of workflow blocks comprises machine-readable workflow instructions; and cause the machine-readable workflow instructions within the at least one of the plurality of workflow blocks to execute.

In another embodiment, a method for managing multi-owner issue resolution is disclosed, comprising: receiving a data structure from a monitoring component via a network interface to a network; accessing a smart contract from a distributed ledger comprising evaluation code; evaluating the data structure with the evaluation code to produce a local qualification decision approving or denying entry to the distributed ledger; receiving, from the network, a number of peer qualification decisions from a number of peer systems; upon obtaining a majority of decisions, comprising the local qualification decision and the number of peer qualification decisions, to approve, creating a plurality of workflow block comprising at least a portion of the data structure and appending the plurality of workflow blocks to the distributed ledger, wherein at least one of the plurality of workflow blocks comprises machine-readable workflow instructions; and causing the machine-readable workflow instructions within the at least one of the plurality of workflow blocks to execute.

In another embodiment, a system for managing multi-owner issue resolution is disclosed, comprising: means to receive a data structure from a monitoring component via a network interface to a network; means to access a smart contract from a distributed ledger comprising evaluation code; means to evaluate the data structure with the evaluation code to produce a local qualification decision approving or denying entry to the distributed ledger; means to receive, from the network, a number of peer qualification decisions from a number of peer systems; means to, upon obtaining a majority of decisions, comprising the local qualification decision and the number of peer qualification decisions, to approve, create a plurality of workflow block comprising at least a portion of the data structure and appending the plurality of workflow blocks to the distributed ledger, wherein at least one of the plurality of workflow blocks comprises machine-readable workflow instructions; and means to cause the machine-readable workflow instructions within the at least one of the plurality of workflow blocks to execute.

The term "issue," as used herein, is an operational parameter of one or a plurality of system device, such as system device(s) 102 (see FIG. 1) that, if requires an external action be applied to one or more system devices or the interactions therebetween to resolve the issue, make be an issue for resolution by the embodiments described herein. By way of non-limiting example, an issue may be an error code, or operational attribute (e.g., internal temperature, operations performed in a unit of time, operations failing, operations previously identified as indicating an issue, etc.).

The term "code," excluding other uses of "code" (e.g., error code), as used herein, refers to machine-readable instructions that, when read by a microprocessor, cause the microprocessor to execute an algorithm embodied by the machine-readable instructions.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
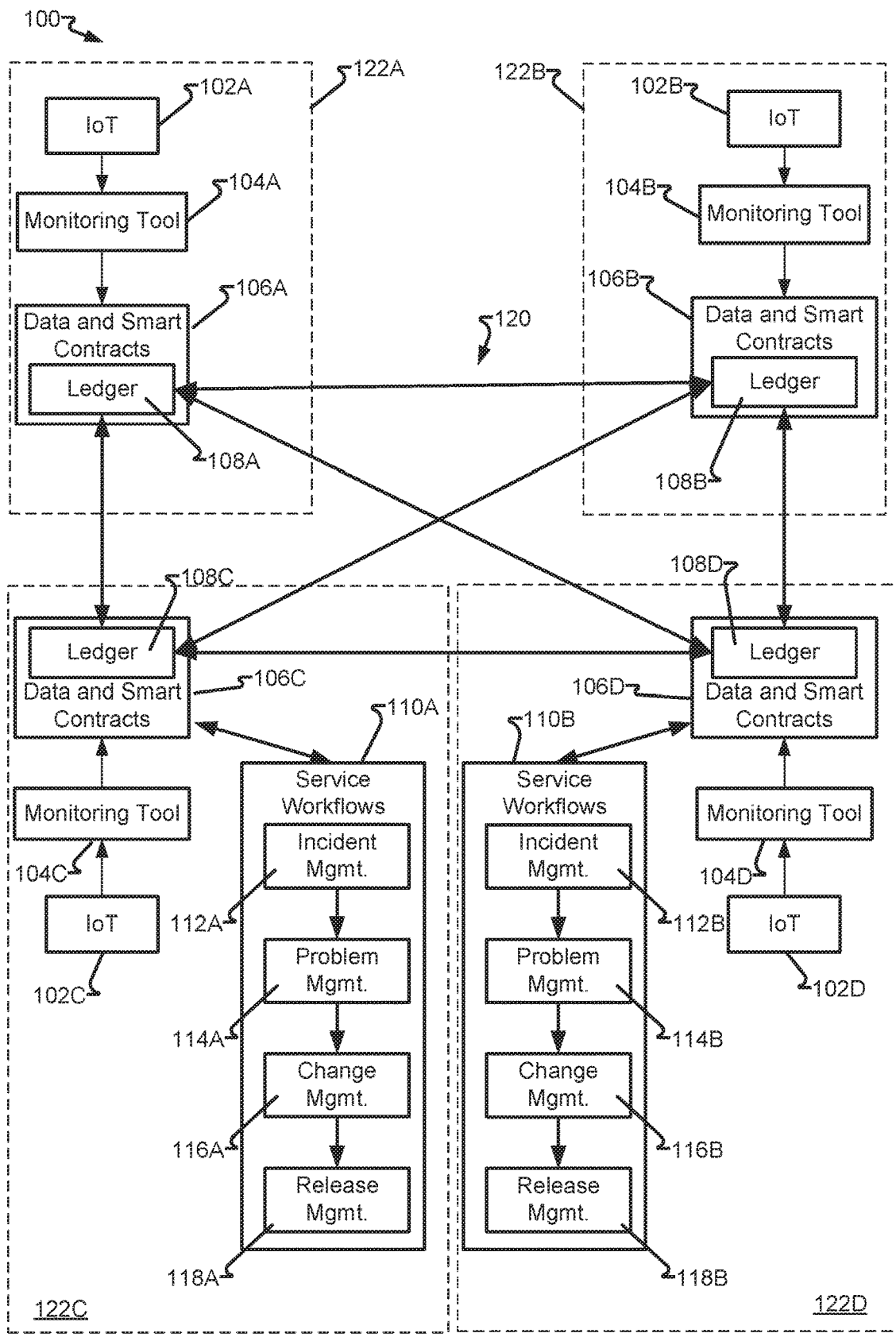
FIG. 1 depicts network of peer systems in accordance with embodiments of the present disclosure.

FIG. 1 depicts network of peer systems 100 in accordance with embodiments of the present disclosure. In one embodiment, a plurality of contact centers 122 are disclosed, each communicated with the other via network 120 and thereby forming a network of peer systems. While four contact centers 122 are disclosed, any number of contact centers 122 greater than two may be utilized. As will be seen, a consensus decision of all contact centers 122 requires a majority and, if only two contact centers 122 are implemented, consensus requires a unanimous decision. With more than two contact center 122, then a minority number of contact centers 122 may dissent with the majority and still produce a consensus.

Each contact center 122 comprises its own hardware and software to perform a system task for which it operates. Accordingly, each contact center 122 may comprise system device 102. In practice, each contact center 122 may have many thousands of system device 102, but for the sake of unnecessarily complicating the figures and description of the figures, each contact center 122 is shown with a single system device 102. System device 102 may be an internet connected device or Internet of Things (IoT) device performing a portion of the system task of contact center 122. By way of non-limiting example, system device 102 may comprise any one or more of a computing device (e.g., microprocessor, plurality of microprocessors, servers, etc.), communication component (e.g., switch, port, router, hub, load-balancer, etc.), storage device (e.g., network attached storage appliance, storage component, array of storage devices, etc.), and/or supporting device (e.g., a component that monitors another component).

In one embodiment, at least one contact center 122 may be associated with a discrete entity. In such an embodiment, the at least one contact center 122 may support all products (comprising hardware and/or software) of the particular entity. In another embodiment, at least one contact center 122 may be a portion of an entity, such as one providing support for a particular product or subset of products.

In another embodiment, the operation of system device 102 may be monitored by monitoring component 104. Monitoring component 104 may be embodied as a server executing a monitoring application or tool and receiving notifications from system device 102. It should be appreciated that monitoring component 104 may be a single tool operating on a single server or a plurality of tools, which may operate on a single or plurality of servers. The notifications from system device 102 may be continuous, such as a log of all operations performed, intermittent (e.g., sampling of operations), polled (e.g., reply to a request for log entries and/or status report), or error status (e.g., silent except to report an error or other non-normal operational parameter). Monitoring component 104 receives the foregoing as a data structure (e.g., log, error message, etc.) and may take action based on a single data structure, such as when an error code is present in the data structure, or upon further processing. Monitoring component 104 may monitor system device 102 to determine if an error or other non-normal operation has or is occurring. For example, system device 102 may be a communications component operating normally but at an abnormal level, either low or high.

In another embodiment, monitoring component 104 may determine that an issue exists, such as by an explicit element of a data structure (e.g., an error code, failure report, abnormal status, etc.) or by determining that, even though system device 102 is operating without error or fault, the operation is itself abnormal. For example, system device 102 may be encountering an abnormal workload which may have a root cause with a different system device 102, an aggregate of a plurality of system device 102, or an external factor (e.g., a telephone service provider had a failure and is unable to deliver some or all telephone communications to system device 102). Accordingly, monitoring component 104 may execute instructions to determine if any operational attribute of system device 102 indicates an issue and, if so, create a data structure comprising indicia of the issue for reporting and/or resolution, such as a submission to server maintaining data and smart contract 106.

Figure 5:
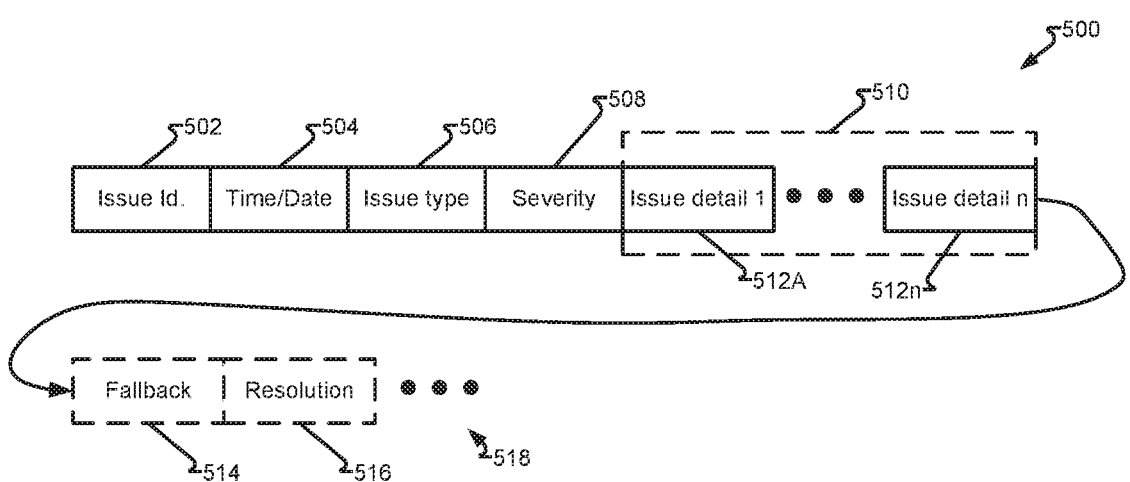
FIG. 5 depicts a data structure in accordance with embodiments of the present disclosure.

Server maintaining data and smart contract 106 may comprise one or more servers but, as above, for the sake of unnecessarily complicating the figures and description, each contact center 122 is show with a single server maintaining data and smart contract 106. Copy of distributed ledger 108 receives a submission from server maintaining data and smart contract 106 in the form of a data structure comprising an issue or indicia of an issue. As a first step, a local monitoring component 104, such as monitoring component 104A may submit the issue to a local server maintaining data and smart contract 106, such server maintaining data and smart contract 106A. Server maintaining data and smart contract 106A, in communication with peer server maintaining data and smart contract 106, here, server maintaining data and smart contract 106B-D, similarly receive the data structure. The data structure, such as the data structure described with respect to FIG. 5, is evaluated against rules in a smart contract comprised by distributed ledger 108 maintained by contact center 122, such as server maintaining data and smart contract 106, which may be maintained as a copy of distributed ledger 108. The smart contract comprises rules for evaluation of submissions (e.g., the data structure provided by monitoring component 104) to produce an accept or reject decision from each of contact center 122 or, more specifically, each of server maintaining data and smart contract 106.

Each server maintaining data and smart contract 106 evaluates the data structure and produces an accept decision or, alternatively, a reject decision. An absence of a reply may be deemed to be an absence of an accept decision. If a majority of contact centers 122 agree to accept the issue into distributed ledger 108, then a new block, comprising the issue or indicia of the issue from the data structure, is created and appended to distributed ledger 108 as maintained by each server maintaining data and smart contract 106A-D. If consensus is not reached, then server maintaining data and smart contract 106A may discard the data structure or forward the data structure to another system, such as a conventional ticket creation system maintained by contact center 122A.

In another embodiment, submission of the data structure to distributed ledger 108 and, when consensus is reached, causes a workflow to be automatically generated as at least one block in distributed ledger 108. The workflow may comprise tasks to be performed by a particular one or ones of the peers. For example, the data structure may comprise an issue requiring an action by more than one of the peers contact centers 122. This may be determined by a lookup by each contact center 122 from rule associated with a particular issue within the data structure. For example, an application provided by contact center 122A may be failing with a particular error code associated with a failure to authenticate a user, the authentication service may be provided by contact center 122B, and a payment processing system provided by contact center 122D. The root problem may be with just one contact center 122 a plurality of contact centers 122, or an interaction therebetween. As a result, an action may be required by two or more contact centers 122. The action may be to perform troubleshooting tasks to identify or isolate the cause of the issue, apply a resolution to resolve all or a portion of the issue, document actions taken, propagate changes to other components, etc. Accordingly, the automatically generated workflow may trigger a local ticket management system, such as service workflow 110 comprising incident management portion 112, problem management portion 114, change management portion 116, and release management portion 118.

The workflow, generated and maintained in distributed ledger 108, may receive updates from service workflow 110. For example, one automatically generated task may require a particular issue be submitted to service workflow 110A, for contact center 122C. Distributed ledger 108 may receive inputs from service workflow 110A in the form of data (e.g., actions taken, status, other issues, etc.) and, if merely informational, create a data record block and append the data record block to distributed ledger 108. If in response to a particular task, create a response block and append the response block to distributed ledger 108 and thereby appending the task with a status update or other response, which may in turn trigger the creation of a new block, such as for a different contact center 122 to perform a task, such as contact center 122D adding creating a new task for management by service workflow 110B.

Figure 2:
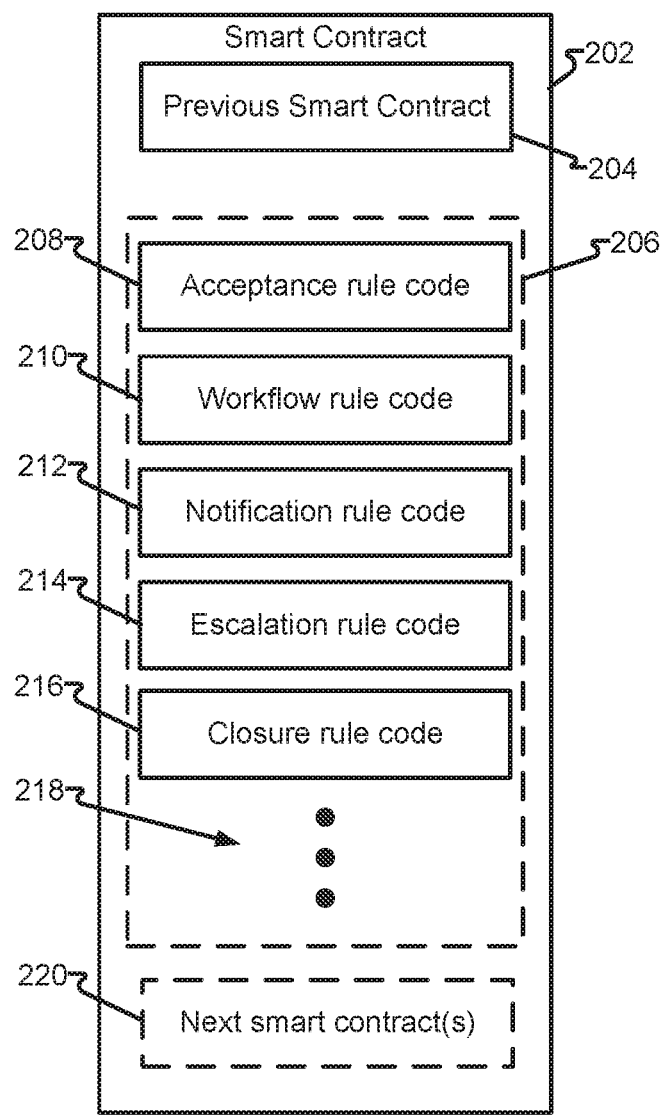
FIG. 2 depicts a smart contract in accordance with embodiments of the present disclosure.

FIG. 2 depicts smart contract 202 in accordance with embodiments of the present disclosure. In one embodiment, smart contract 202 comprises workflow rules 206 defining the criteria for making an acceptance decision and the resulting workflow if accepted. It should be appreciated that "criteria," as used herein, may be a single criterion or a plurality of criteria, unless expressly stated otherwise. Participating peers, such as each of contact center 122A-D, establish a smart contract comprising rules. The smart contract is entered as one or more blocks appended to distributed ledger 108. Each contact center 122, upon receiving a data structure associated with submission to distributed ledger 108, evaluates the data structure utilizing one or more rules within smart contract 202. Smart contract 202 may be maintained in server maintaining data and smart contract 106 as blocks along with workflow blocks or smart contract 202 may be a descriptive blockchains from the workflow blocks, without departing from the scope of the embodiments.

As a block in a blockchain, smart contract 202 comprises a reference to previous smart contract 204 in the blockchain, such as a hash of the previous block. Optionally, smart contract 202 may comprise references to one or more subsequent smart contracts 220, such as to identify a forking of the blockchain from smart contract 202, such as the hash of subsequent block(s). For example, if the workflow blockchain requires an action by contact center 122A and contact center 122B, then the workflow may fork, and each fork appended with a block identifying the action for each contact center 122A and 122B.

In another embodiment, smart contract 202 may comprises workflow rules 206 which may further comprise one or more rules embodied as machine-readable instructions for execution by a processor. Workflow rules 206 may be embodied as one or more rules, such as acceptance rule code 208, workflow rule code 210, notification rule code 212, escalation rule code 214, closure rule code 216, and/or other code as may be agreed upon by network of peer systems 100 as indicated by ellipses 218.

Acceptance rule code 208 define the criteria by which a data structure is evaluated and, if accepted, appended to distributed ledger 108 as a new block, which may further automatically trigger workflow rules 210.

Workflow rules 210 may define the steps required to resolve an issue and the party to perform the steps. Workflow rules 210 may generate new blocks for the steps and append the block to distributed ledger 108. Workflow rules 210 may execute the code within comprising and/or initiating one or more of notification rule code 212, escalation rule code 214, closure rule code 216, and/or other code.

Notification rules 212 may define the notifications to be generated and to whom the notifications are sent. Notification rules 212 may generate new blocks for informational reporting, such as to stakeholders not involved in resolving the issue, step completion, such as to notify other parties that a particular task to resolve the issue has been completed. This may further cause workflow rules 210 to generate subsequent tasks, if so determined by workflow rules 210. Additionally or alternatively, notification rules 212 may determine the criteria for receiving data related to a particular issue or block, such as to maintain a record of actions taken, states of components, time/date of actions taken, or other recordkeeping and/or informational data.

Escalation rules 214 may define the actions, and subsequent blocks to generate, based on an escalation event. An escalation event may be absence of a resolution within a previously determined period of time. Accordingly, escalation rules 214 may create a new block for appending to distributed ledger 108 defining a task in response to an escalation event. Escalation may be "up," as in to create blocks that will result in additional resources or other actions designed to accelerate resolution of the issue, or "down." A "down" escalation may be triggered, such as upon a partial resolution of the issue or upon the occurrence of a higher priority issue. Additionally or alternatively, a fallback block may be created by escalation rules 214 and/or workflow rules 210, to provide an equivalent function, in whole or in part, to the function impacted by the issue.

Closure rules 216 may define the actions required to close or conclude the issue. A closure event may be a signal from a conventional ticket system, such as service workflow 110, that an issue has been resolved. In another embodiment, system device 102 may have triggered the issue and now no longer has the issue, accordingly, system device 102 and/or monitoring component 104, may report the resolution (e.g., no error code, operational attribute is normal, etc.), and thereby closing the issue. Accordingly, closure rules 216 may create a closure block and append the block to distributed ledger 108.

A party, such as one of contact center 122, may amend a block by submitting an update block to network of peer systems 100 and, if consensus is obtained, append the updated block to distributed ledger 108. In this way, a change or update in a rule may be propagated to the distributed ledger 108 and any one or more of acceptance rules 208, workflow rules 210, notification rules 212, escalation rules 214, closure rules 216, or other rules, as embodied by their respective blocks and/or their rules for the creation of subsequent blocks and/or the content of such created blocks, may be updated.

Figure 3:
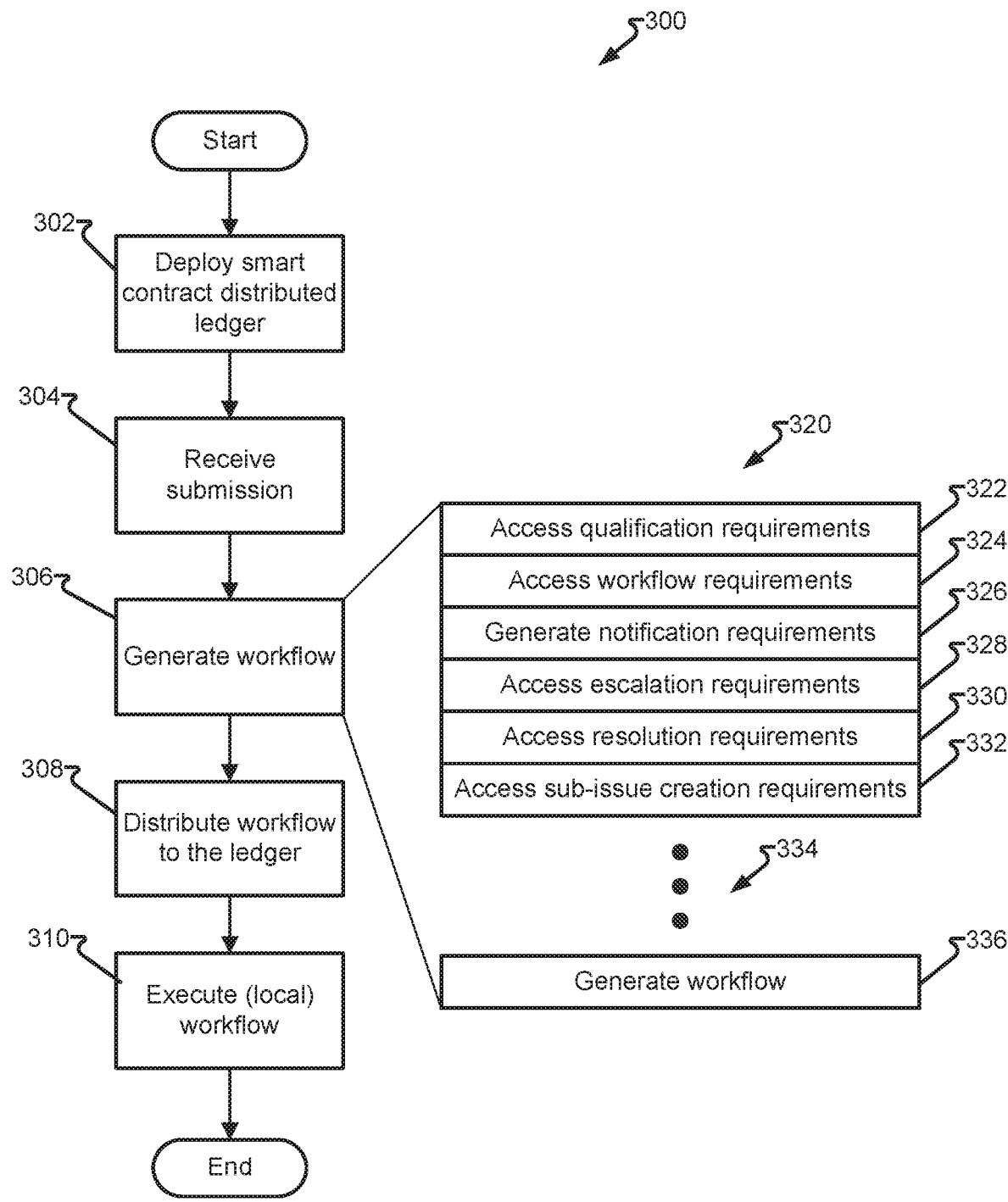
FIG. 3 depicts a first process in accordance with embodiments of the present disclosure.

FIG. 3 depicts first process 300 in accordance with embodiments of the present disclosure. In one embodiment, process 300 establishes and maintains smart contract smart contract 202. Process 300 may be executed by a processor, such as by server maintaining data and smart contract 106 and repeated for each peer system (e.g., contact center 122A-D) within network of peer systems 100. Step 302 may leverage a novel or existing blockchain format configured to maintain executable code (e.g., smart contracts) within the blocks.

Step 304 receives a submission for inclusion into distributed ledger 108, such as by monitoring component 104 submitting a data structure comprising an operational attribute of system device 102. Upon consensus to append a block associated with the data structure (e.g., comprising at least a portion, indicia of an issue identified by or within the data structure), step 306 generates a workflow to resolve the issue.

Step 306 is variously embodied, one or more workflow creation tasks 320 embodied as blocks and appended to distributed ledger 108, may be generated. Additionally or alternatively, at least a portion of the workflow tasks may be generated as the result of the execution of code of preceding blocks. Workflow creation tasks 320 may be generate in response to one or more of accessing qualification requirements 322, accessing workflow requirements 324, generating notification requirements 326, accessing escalation requirements, accessing resolution requirements, accessing sub-issue creation requirements, accessing any other requirements, as illustrated by ellipses 334, and then generating the workflow 336.

Accordingly, step 306 may be specific to a particular issue, family of issues, general issue resolution procedure, etc. For example, qualification requirements 322 may comprise code for execution to evaluate the submission received in step 304. If consensus is not obtained to allow the submission to be appended to server maintaining data and smart contract 106 then a block may be created identifying the submission as refused and generation of the workflow (step 336) producing a record that the submission was received and identifying the issue as not accepted and, optionally, closed. If consensus is obtained, the workflow requirements may provide the detailed steps (as embodied by the blocks of distributed ledger 108) to resolve the issue. For example, the creation of a notification block identifying a process of contact center 122B that will be impacted for a period of time while the issue is being resolve, the creation of a notification block identifying an operation to perform on a component of contact center 122D, and upon receiving notification that the operation has been performed, the creation of one particular notification block, if the operation produced the desired result, or a different notification block, if the operation did not produce the desired result. It should be appreciated that workflow requirements may range from a few static blocks, to a substantial number of blocks that may, in turn, append new blocks to distributed ledger 108.

Issues that are first encounters, may not have such a predetermined workflow. Accordingly, step 324 accessing of workflow may implement a general issue resolution operation to be performed by one or more of contact center 122 of network of peer systems 100.

In another embodiment, the generation of notification requirements in step 326, notification requirements in step 326, escalation requirements in step 328, resolution requirements in step 330, sub-issue creation requirements in step 332, and other requirements (see ellipses step 334) may be a sub process of workflow requirements 324. For example, workflow requirements in step 324 may have a requirement of "notify stakeholders," and call notification requirements in step 326 which identifies the relevant stakeholders for the issue and provides or creates a notification block. Similarly, the generation of workflow in step 324 may access escalation requirement in step 328 and create a block, such as to escalate the issue if not resolved within two hours, or upon the occurrence of a subsequent issue or state of a component or system. Generation of workflow in workflow requirements 324 may call the generation of resolution requirements in step 330, such as to automatically close an issue (e.g., a software patch was needed for system device 102A and now monitoring component 104A is reporting the software has been installed) and/or who may be presented with a prompt to close an issue and/or be authorized to create a block associated with the issue being closed for appending to distributed ledger 108. Blocks identified but not yet created may then be created by step 336 generating the workflow.

Step 332 may be included to generate any sub-issues that may be determined and/or known in advance. For example, accessing the escalation requirements in step 328 may create a block that triggers an escalation if an issue is not resolved within two hours, this may call sub-issue creation in step 332 to spawn a new workflow (step 306), such as associated with initiation of a failover process, bringing an idle component online, or other action.

In step 302, server maintaining data and smart contract 106 deploys distributed ledger 108. Step 308 then distributes the ledger to each contact center 122 within network of peer systems 100. Step 308 may distribute a complete copy of distributed ledger 108 or a portion (e.g., newly created blocks from step 308). In step 310, each contact center 122 may then execute the smart contract, such as via server maintaining data and smart contract 106, to execute the code within the blocks and process 300 end with the blocks created, or automatically spawning from prior blocks.

When a processor, such as a processor associated with any one or more of server maintaining data and smart contract 106 accesses a requirement (one or more of steps 322-334), external information may be required. It should be appreciated that each server maintaining data and smart contract 106 has access to storage devices comprising non-transitory storage device(s) which may maintain data and/or rules utilized as inputs for the one or more steps 322-334.

Figure 4:
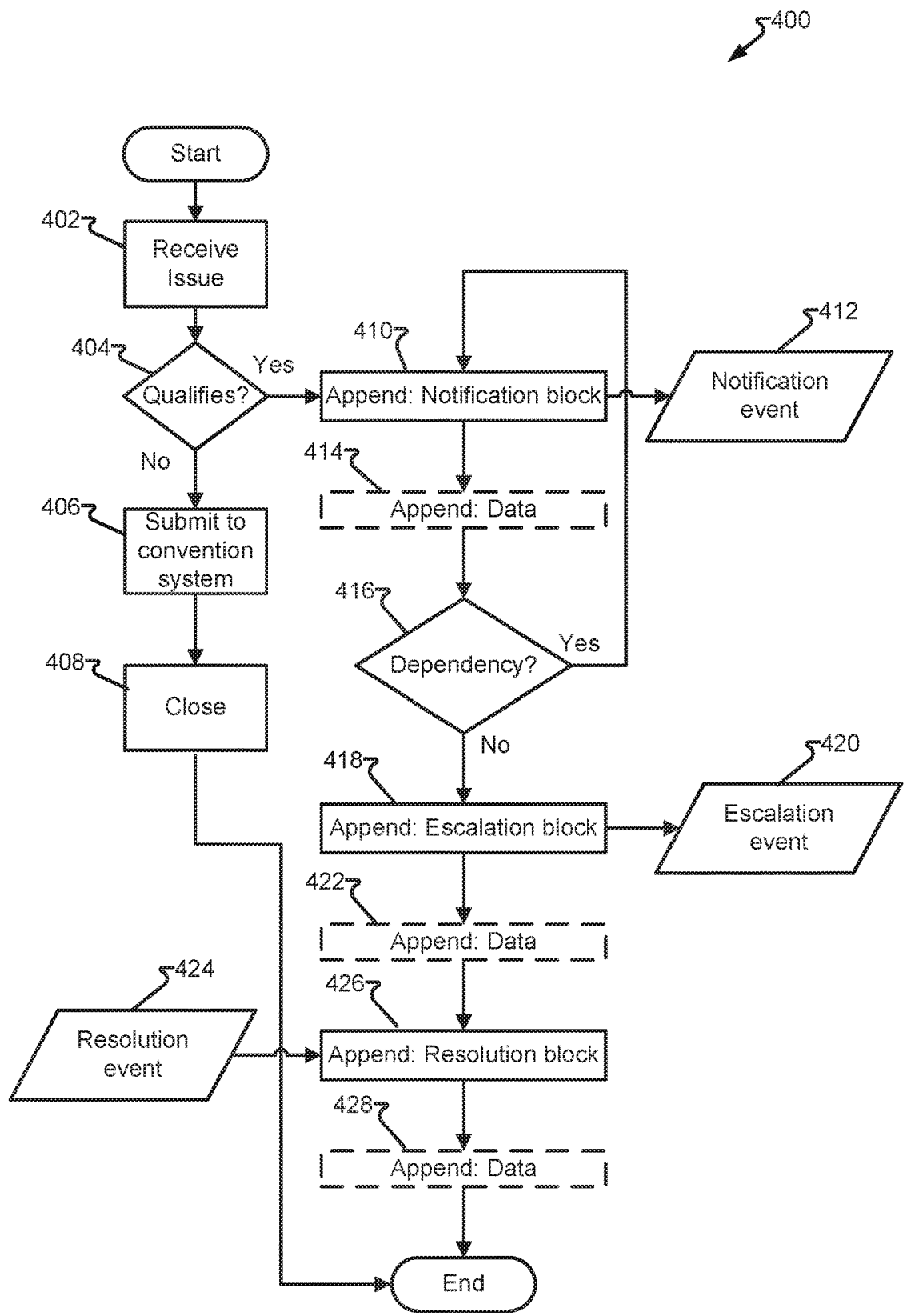
FIG. 4 depicts a second process in accordance with embodiments of the present disclosure.

FIG. 4 depicts second process 400 in accordance with embodiments of the present disclosure. In one embodiment, process 400 is embodied as machine-readable instructions and executed by a server, such as server maintaining data and smart contract 106. In step 402, an issue is received, such as in the form of a data structure identifying an issue or indicia of an issue associated with an operational attribute of system device 102. A determination is made, in test 404, whether the issue qualifies for entry into distributed ledger 108. If test 404 is determined in the negative, then process 400 may end or, optionally, test 404 may submit the issue to a different/conventional ticket system in step 406 and then, in step 408 the issue may be closed, at least with respect to process 400. As a further option, test 404 may create at least one block and append the block to distributed ledger 108 and, if not qualified, step 408 creates a closure block and appends the block to distributed ledger 108. Process 400 may then end.

If test 404 is determined in the affirmative, steps may be executed comprising the generation of a workflow. A workflow comprises a number of steps to perform an action, provide a notification, make a decision, or other operations as embodied by steps and/or tests 410-428. Step 410 creates and appends a notification block and, when executed, outputs notification event 412. As described in more detail above, notification block may be informational (e.g., no action required, status update, etc.) and/or actionable (e.g., a task is identified to be performed and the notification delivered to a component associated with the responsible party and/or component receiving notification event 412). Optional step 414 receives data, such as may be authorized by notification requirements accessed in step 326 (see FIG. 3). Step 414 may receive notes, logs, error states, or other information for recordkeeping purposes and/or for the creation of subsequent blocks to be appended to distributed ledger 108. For example, test 416 may determine if a dependency exists, such as an issue identified as occurring within contact center 122A, but being dependent on contact center 122B performing an action. Test 416 may be determined based on factors obtained from the issue in step 402 (e.g., it is a know dependency that a error observed on system device 102A is caused by an issue occurring with system device 102B) or dynamic (e.g., notification block appended in step 410 and/or data block appended in step 414 indicates a need to have an action taken with regard to system device 102D that was not previously anticipated). Accordingly, test 416, when determined in the affirmative, may repeat to create a number of notification blocks for each iteration of step 410. Once all known dependencies have been determined, test 416 is determined in the negative and processing continues to step 418.

Step 418 appends an escalation block and, when executed and evaluated to determine the escalation event has occurred, output escalation event 420. Optional step 422, similar to step 414, may be excited to receive data relevant to the issue and appended to distributed ledger 108. Next, step 426 executes a resolution block, which may be predicated on indicia of closure received in step 422. When executed, resolution block outputs resolution event 424. Optional step 428 receives any data, such as notes and/or other information for appending to distributed ledger 108.

FIG. 5 depicts data structure 500 in accordance with embodiments of the present disclosure. In one embodiment, data structure 500 is received by server maintaining data and smart contract 106 from an associated monitoring component 104 monitoring system device 102. The fields of data structure 500 are variously embodied and may comprise one or more of issue identification field 502 (e.g., serial number, issue family, issue source, etc.), time/date field 504 identifying the time/date the issue associated with data structure 500 originated, issue type field 506 (e.g., software install/update, service outage, utilization abnormality, fault, etc.), severity field 508 (e.g., critical service outage, important utilization above normal, minor, etc.), and issue details block 510 comprising one or more issue details 512A-n (e.g., error codes, error messages, log files, operational attributes, memory dump, user notes, etc.). Optionally, data structure may comprise fields such as identifying a fallback option that could or was utilized in fallback field 514 (e.g., "Hub B available to offload connections from hub A", "Video server taken offline and requests routed to automated text response server," etc.) and/or resolution field 516 (e.g., "Due to updates to the server A, ignore overutilization messages from server B," "Note, the last time test 404 occurred, the DNS server had a bad entry in the table," etc.). Other information illustrated by ellipses 518 may also be included as a matter of design choice.

Server maintaining data and smart contract 106 may receive data structure 500 and, wholly or in part, make a determination to accept the issue within to distributed ledger 108.

Figure 6:
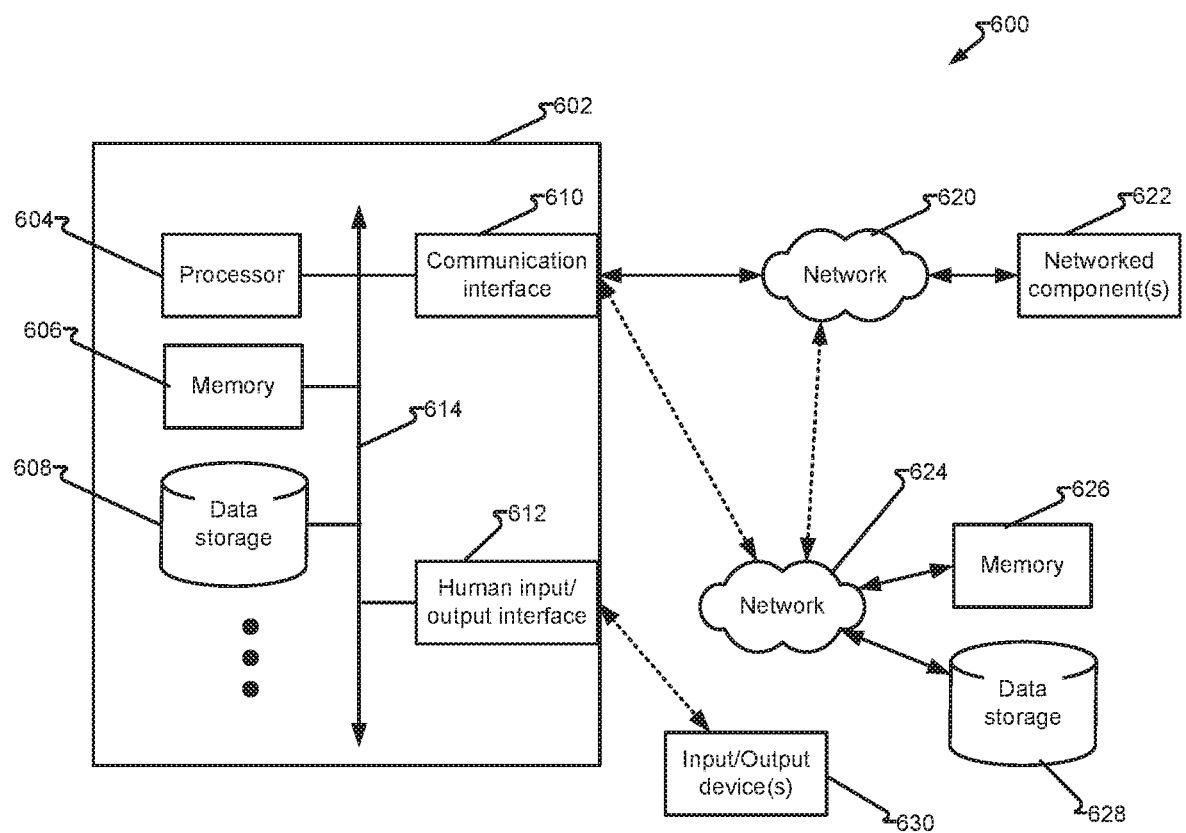
FIG. 6 depicts a system in accordance with embodiments of the present disclosure.

FIG. 6 depicts system 600 in accordance with embodiments of the disclosure. In one embodiment, a server maintaining data and smart contract 106 may be embodied, in whole or in part, as device 602 comprising various components and connections to other components and/or systems. The components are variously embodied and may comprise processor 604. Processor 604 may be embodied as a single electronic microprocessor or multiprocessor device (e.g., multicore) having therein components such as control unit (s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor (e.g., processor 604) and the hardware and other circuitry thereof.

In addition to the components of processor 604, device 602 may utilize memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, etc. In another embodiment, communication interface 610 may comprise, or be comprised by, human input/output interface 612. Communication interface 610 may be configured to communicate directly with a networked component or utilize one or more networks, such as network 620 and/or network 624.

Network 120 may be embodied, in whole or in part, as network 620. Network 620 may be a wired network (e.g., Ethernet), wireless (e.g., WiFi, Bluetooth, cellular, etc.) network, or combination thereof and enable device 602 to communicate with network component(s) 622. In other embodiments, network 620 may be embodied, in whole or in part, as a telephony network (e.g., public switched telephone network (PSTN), private branch exchange (PBX), cellular telephony network, etc.)

Additionally or alternatively, one or more other networks may be utilized. For example, network 624 may represent a second network, which may facilitate communication with components utilized by device 602. For example, network 624 may be an internal network to a business entity or other organization, such as contact center 122A, whereby components are trusted (or at least more so) that networked components 622, which may be connected to network 620 comprising a public network (e.g., Internet) that may or may not be as trusted, such to connect to contact center 122B-D.

Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. For example, memory 626 and/or data storage 628 may be an external data repository (e.g., server farm, array, "cloud," etc.) and allow device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of memory 606, data storage 608, memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, switch, port, or other communication component such that a particular output of processor 604 enables (or disables) input/output device 630, which may be associated with network 620 and/or network 624, to allow (or disallow) communications between two or more nodes on network 620 and/or network 624. Ones of ordinary skill in the art will appreciate that other communication equipment may be utilized, in addition or as an alternative, to those described herein without departing from the scope of the embodiments.

The term "server" as used herein refers to a device comprising at least one microprocessor (or, more simply, "processor") operable to execute machine-readable instructions to configure the processor(s) to perform a specific operation, comprise or access non-transitory storage device or devices to retrieve and/or store data, and have a network interface (e.g., network interface card or chip, port, antenna, etc.) to a network to communicate with other components similarly attached to the network.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system.

For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system for managing multi-owner issue resolution, comprising:
    a network interface to a network;
    a server, comprising a microprocessor that accesses machine-readable instructions from a non-transitory memory and executes the machine-readable instructions to cause a microprocessor to:
    receive a data structure from a monitoring component via the network interface;
    access a smart contract from a distributed ledger comprising evaluation code;
    evaluate the data structure with the evaluation code to produce a local qualification decision approving or denying entry to the distributed ledger;
    receive, from the network, a number of peer qualification decisions from a number of peer systems;
    upon obtaining a majority of decisions, comprising the local qualification decision and the number of peer qualification decisions, to approve, create a plurality of workflow blocks comprising at least a portion of the data structure and appending the plurality of workflow blocks to the distributed ledger, wherein at least one of the plurality of workflow blocks comprises machine-readable workflow instructions; and
    cause the machine-readable workflow instructions within the at least one of the plurality of workflow blocks to execute.

2. The system of claim 1, wherein the data structure is received from the monitoring component, further comprising:
    the monitoring component receiving an operational attribute of a system component, wherein the monitoring component comprises a microprocessor executing machine-readable instructions; and
    wherein the monitoring component, upon determining the operational attribute indicates an issue, causes the microprocessor to further execute machine-readable instructions to create the data structure and submit the data structure to the number of peer systems and the server.

3. The system of claim 1, wherein the microprocessor further executes the machine-readable instructions to cause the microprocessor to provide, via the network interface, the data structure to the number of peer systems and, in response, receives the number of peer qualification decisions.

4. The system of claim 1, wherein the microprocessor, further executes the machine-readable instructions to cause the microprocessor to, upon a failure to obtain the majority of decisions, comprising the local qualification decision and the number of peer qualification decisions, to approve, creating a service ticket and routing the service ticket to a service support application.

5. The system of claim 1, wherein the machine-readable workflow instructions within the at least one of the plurality of workflow blocks, upon execution, notifies at least one of the number of peer systems to perform a task.

6. The system of claim 5, wherein the machine-readable workflow instructions within the at least one of the plurality of workflow blocks, upon execution, determines that at least one task requires an action of at least one of the number of peer systems.

7. The system of claim 6, wherein the machine-readable workflow instructions within the at least one of the plurality of workflow blocks, further comprises machine-readable workflow instructions comprising, in response to determining that at least one task requires the action of at least one of the number of peer systems:
    create a subsequent block comprising machine-readable workflow instructions comprising indicia of the at least one task; and
    append the subsequent block to the distributed ledger.

8. The system of claim 5, wherein the machine-readable workflow instructions within the at least one of the plurality of workflow blocks, upon execution, determines that a time threshold for resolution of the at least one task has expired.

9. The system of claim 1, wherein the microprocessor further executes the machine-readable instructions to cause the microprocessor to:
    receive data identifying one the plurality of workflow blocks;
    create a subsequent block comprising the data; and
    append the subsequent block to the distributed ledger.

10. A method for managing multi-owner issue resolution, comprising:
    receiving a data structure from a monitoring component via a network interface to a network;
    accessing a smart contract from a distributed ledger comprising evaluation code;
    evaluating the data structure with the evaluation code to produce a local qualification decision approving or denying entry to the distributed ledger;
    receiving, from the network, a number of peer qualification decisions from a number of peer systems;
    upon obtaining a majority of decisions, comprising the local qualification decision and the number of peer qualification decisions, to approve, creating a plurality of workflow blocks comprising at least a portion of the data structure and appending the plurality of workflow blocks to the distributed ledger, wherein at least one of the plurality of workflow blocks comprises machine-readable workflow instructions; and
    causing the machine-readable workflow instructions within the at least one of the plurality of workflow blocks to execute.

11. The method of claim 10, wherein receiving the data structure further comprises:
    receiving, by the monitoring component, an operational attribute of a system component, wherein the monitoring component comprises a microprocessor executing machine-readable instructions; and
    determining whether the operational attribute indicates an issue; and in response to determining the operational attribute indicates an issue, creating the data structure and submitting the data structure to the number of peer systems and a server.

12. The method of claim 10, further comprising providing the data structure to the number of peer systems and, in response, receiving the number of peer qualification decisions.

13. The method of claim 10, further comprising:
upon a failure to obtain the majority of decisions, comprising the local qualification decision and the number of peer qualification decisions, to approve, creating a service ticket; and
routing the service ticket to a service support application.

14. The method of claim 10, wherein the machine-readable workflow instructions within the at least one of the plurality of workflow blocks, upon execution, notifies at least one of the number of peer systems to perform a task.

15. The method of claim 14, wherein the machine-readable workflow instructions within the at least one of the plurality of workflow blocks, upon execution, determines that at least one task requires an action of at least one of the number of peer systems.

16. The method of claim 15, wherein the machine-readable workflow instructions within the at least one of the plurality of workflow blocks, further comprises machine-readable workflow instructions comprising, in response to determining that at least one task requires the action of at least one of the number of peer systems:
create a subsequent block comprising machine-readable workflow instructions comprising indicia of the at least one task; and
append the subsequent block to the distributed ledger.

17. The method of claim 14, wherein the machine-readable workflow instructions within the at least one of the plurality of workflow blocks, upon execution, determines that a time threshold for resolution of the at least one task has expired.

18. The method of claim 10, further comprising:
receiving data identifying one the plurality of workflow blocks;
creating a subsequent block comprising the data; and
appending the subsequent block to the distributed ledger.

19. A system for managing multi-owner issue resolution, comprising:
means to receive a data structure from a monitoring component via a network interface to a network;
means to access a smart contract from a distributed ledger comprising evaluation code;
means to evaluate the data structure with the evaluation code to produce a local qualification decision approving or denying entry to the distributed ledger;
means to receive, from the network, a number of peer qualification decisions from a number of peer systems;
means to, upon obtaining a majority of decisions, the majority of decisions comprising the local qualification decision and the number of peer qualification decisions, to approve, create a plurality of workflow blocks comprising at least a portion of the data structure and appending the plurality of workflow blocks to the distributed ledger, wherein at least one of the plurality of workflow blocks comprises machine-readable workflow instructions; and
means to cause the machine-readable workflow instructions within the at least one of the plurality of workflow blocks to execute.

20. The system of claim 19, further comprising:
means to receiving, at the monitoring component, an operational attribute of a system component, wherein the monitoring component comprises a microprocessor executing machine-readable instructions; and
means to, upon determining the operational attribute indicates an issue, create the data structure and submit the data structure to the number of peer systems and a server.

* * * * *